US010518197B2

(12) United States Patent
Teranishi et al.

(10) Patent No.: US 10,518,197 B2
(45) Date of Patent: Dec. 31, 2019

(54) MONOLITHIC SEPARATION MEMBRANE STRUCTURE AND METHOD OF MANUFACTURE THEREOF

(71) Applicant: NGK Insulators, Ltd., Nagoya-Shi (JP)

(72) Inventors: Makoto Teranishi, Nagoya (JP); Makiko Ichikawa, Nagoya (JP); Hideyuki Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 410 days.

(21) Appl. No.: 14/851,425

(22) Filed: Sep. 11, 2015

(65) Prior Publication Data

US 2016/0001203 A1    Jan. 7, 2016

Related U.S. Application Data

(63) Continuation of application No. PCT/JP2015/056978, filed on Mar. 10, 2015.

(30) Foreign Application Priority Data

Mar. 28, 2014    (JP) .................................. 2014-068607

(51) Int. Cl.
*B01D 29/00* (2006.01)
*B01D 29/05* (2006.01)
(Continued)

(52) U.S. Cl.
CPC ......... *B01D 29/05* (2013.01); *B01D 29/0093* (2013.01); *B01D 46/0001* (2013.01);
(Continued)

(58) Field of Classification Search
CPC .... B01D 53/22; B01D 63/066; B01D 65/003; B01D 2313/04; B01D 39/0093;
(Continued)

(56) References Cited

U.S. PATENT DOCUMENTS 4,598,054 A * 7/1986 Mochida ............... C04B 35/195
501/112
2004/0202883 A1* 10/2004 Scheydecker ......... C04B 41/009
428/539.5

(Continued)

FOREIGN PATENT DOCUMENTS

CA        2 851 219 A1    4/2013
CN        101558025 A    10/2009
(Continued)

OTHER PUBLICATIONS

Cahoon, H., and Christensen, C., "Sintering and grain growth of alpha-alumina", Journal of the American Ceramic Society, vol. 39, No. 10, pp. 337-344 (1956).*
(Continued)

*Primary Examiner* — Benjamin L Lebron
(74) *Attorney, Agent, or Firm* — Burr & Brown, PLLC

(57) ABSTRACT

A monolithic separation membrane structure comprises a substrate, a first support layer and a separation membrane. The substrate is composed of a porous material and including a plurality of through holes. The first support layer is formed on an inner surface of the plurality of through holes. The separation membrane arranged in the first support layer. The first support layer includes an aggregate material having alumina as a main component, an inorganic binder have titania as a main component, and a sintering additive having at least one of silica and magnesia as a main component.

5 Claims, 3 Drawing Sheets

(51) Int. Cl.
| | |
|---|---|
| *B01D 46/00* | (2006.01) |
| *B01D 63/06* | (2006.01) |
| *B01D 67/00* | (2006.01) |
| *B01D 69/10* | (2006.01) |
| *B01D 69/12* | (2006.01) |
| *B01D 71/02* | (2006.01) |
| *C04B 35/111* | (2006.01) |
| *C04B 35/14* | (2006.01) |
| *C04B 35/46* | (2006.01) |
| *C04B 38/00* | (2006.01) |
| *C04B 41/85* | (2006.01) |
| *C04B 41/89* | (2006.01) |
| *C04B 111/00* | (2006.01) |

(52) U.S. Cl.
CPC ........... *B01D 63/066* (2013.01); *B01D 69/10* (2013.01); *B01D 71/025* (2013.01); *B01D 71/027* (2013.01); *C04B 35/111* (2013.01); *C04B 35/14* (2013.01); *C04B 35/46* (2013.01); *C04B 38/0003* (2013.01); *C04B 38/0006* (2013.01); *C04B 41/85* (2013.01); *C04B 41/89* (2013.01); *B01D 67/0046* (2013.01); *B01D 69/12* (2013.01); *B01D 71/021* (2013.01); *B01D 71/024* (2013.01); *B01D 2323/12* (2013.01); *B01D 2325/24* (2013.01); *B01D 2325/30* (2013.01); *C04B 38/0054* (2013.01); *C04B 2111/00793* (2013.01); *C04B 2111/00801* (2013.01); *C04B 2235/36* (2013.01)

(58) Field of Classification Search
CPC .. B01D 29/05; B01D 67/0046; B01D 71/021; B01D 71/024; B01D 2323/12; B01D 69/12; B01D 29/0093; B01D 46/0001; B01D 69/10; B01D 71/025; B01D 71/027; B01D 2325/24; B01D 2325/30; C04B 41/85; C04B 41/89; C04B 38/00; C04B 35/111; C04B 35/14; C04B 35/46; C04B 38/0003; C04B 38/0006; C04B 38/0054; C04B 2111/00793; C04B 2111/00801; C04B 2235/36
See application file for complete search history.

(56) References Cited

U.S. PATENT DOCUMENTS

| | | | |
|---|---|---|---|
| 2005/0118097 A1* | 6/2005 | Sakon | B82Y 30/00 423/625 |
| 2007/0026190 A1* | 2/2007 | Baba | B01D 46/0001 428/116 |
| 2008/0138569 A1 | 6/2008 | Collier et al. | |
| 2009/0107330 A1* | 4/2009 | Gu | B01D 53/228 95/55 |
| 2010/0266461 A1* | 10/2010 | Sappok | B01D 39/2093 422/177 |
| 2010/0300294 A1* | 12/2010 | Clinton | B01D 53/22 96/10 |
| 2011/0045971 A1 | 2/2011 | Collier et al. | |
| 2012/0074061 A1 | 3/2012 | Teranishi et al. | |
| 2012/0301666 A1 | 11/2012 | Collier et al. | |
| 2014/0021129 A1 | 1/2014 | Teranishi et al. | |
| 2015/0008177 A1 | 1/2015 | Yajima et al. | |
| 2015/0008180 A1 | 1/2015 | Uchikawa et al. | |

FOREIGN PATENT DOCUMENTS

| | | |
|---|---|---|
| EP | 2 030 960 A2 | 3/2009 |
| EP | 2 236 197 A1 | 10/2010 |
| JP | S63-197510 A | 8/1988 |
| JP | 2003-230822 A1 | 8/2003 |
| JP | 2006-212551 A1 | 8/2006 |
| WO | 2010/134514 A1 | 11/2010 |
| WO | 2012/128217 A1 | 9/2012 |
| WO | 2013/059146 A1 | 4/2013 |
| WO | 2013/146956 A1 | 10/2013 |
| WO | 2013/147271 A1 | 10/2013 |

OTHER PUBLICATIONS

Bakken, A. Abstract of Doctoral Thesis, "Sintering behavior and mechanical properties of porous alumina ceramics". 2013.*
Bakken, A. (2013). Sintering behavior and mechanical properties of porous alumina ceramics (doctoral dissertation).*
R Svinka et al 2011 IOP Conf. Ser.: Mater. Sci. Eng. 18 182008.*
Extended European Search Report, European Application No. 15763806.5, dated Nov. 2, 2017 (8 pages).
English translation of International Preliminary Report on Patentability (Chapter I) (Application No. PCT/JP2015/056978) dated Oct. 13, 2016.
International Search Report (Application No. PCT/JP2015/056978) dated Jun. 2, 2015.

* cited by examiner

MONOLITHIC SEPARATION MEMBRANE STRUCTURE AND METHOD OF MANUFACTURE THEREOF

BACKGROUND OF THE INVENTION

1. Field of the Invention

The present invention relates to a monolithic separation membrane structure and to a method of manufacturing the same.

2. Description of Related Art

A monolithic separation membrane structure is known which typically includes a substrate that has a plurality of through holes, a support layer that is formed on an inner surface of the through holes, and a separation membrane that is formed on an inner surface of the support layer (reference to PCT Laid Open Application 2013/059146).

In Patent Literature 1, a method is proposed in which titania is added as a binding agent to the support layer for the purpose of enhancing the strength and chemical resistance of the support layer.

SUMMARY OF THE INVENTION

Technical Problem

However, a reduction in the thickness of the support layer and an increase in the surface area of the separation membrane are effective in enhancing the filtration efficiency of a monolithic separation membrane structure. As a result, there is a need to further enhance the strength of the support layer in order to reduce the thickness of the support layer.

The present invention is proposed based on the situation described above, and has the purpose of providing a monolithic separation membrane structure that enables enhancement to the strength of a support layer and of providing a method of manufacture for the same.

Solution to Problem

The monolithic separation membrane structure according to the present invention includes a substrate main body, a first support layer and a separation membrane. The substrate main body is composed of a porous material and includes a plurality of through holes. The first support layer is formed on an inner surface of the plurality of through holes. The separation membrane is arranged in the first support layer. The first support layer includes alumina, titania and at least one of silica and magnesia.

Effect of Invention

The present invention enables the provision of a monolithic separation membrane structure that enables enhancement to the strength of the support layer, and a method of manufacture for the same.

DETAILED DESCRIPTION OF THE INVENTION

Figure 1:
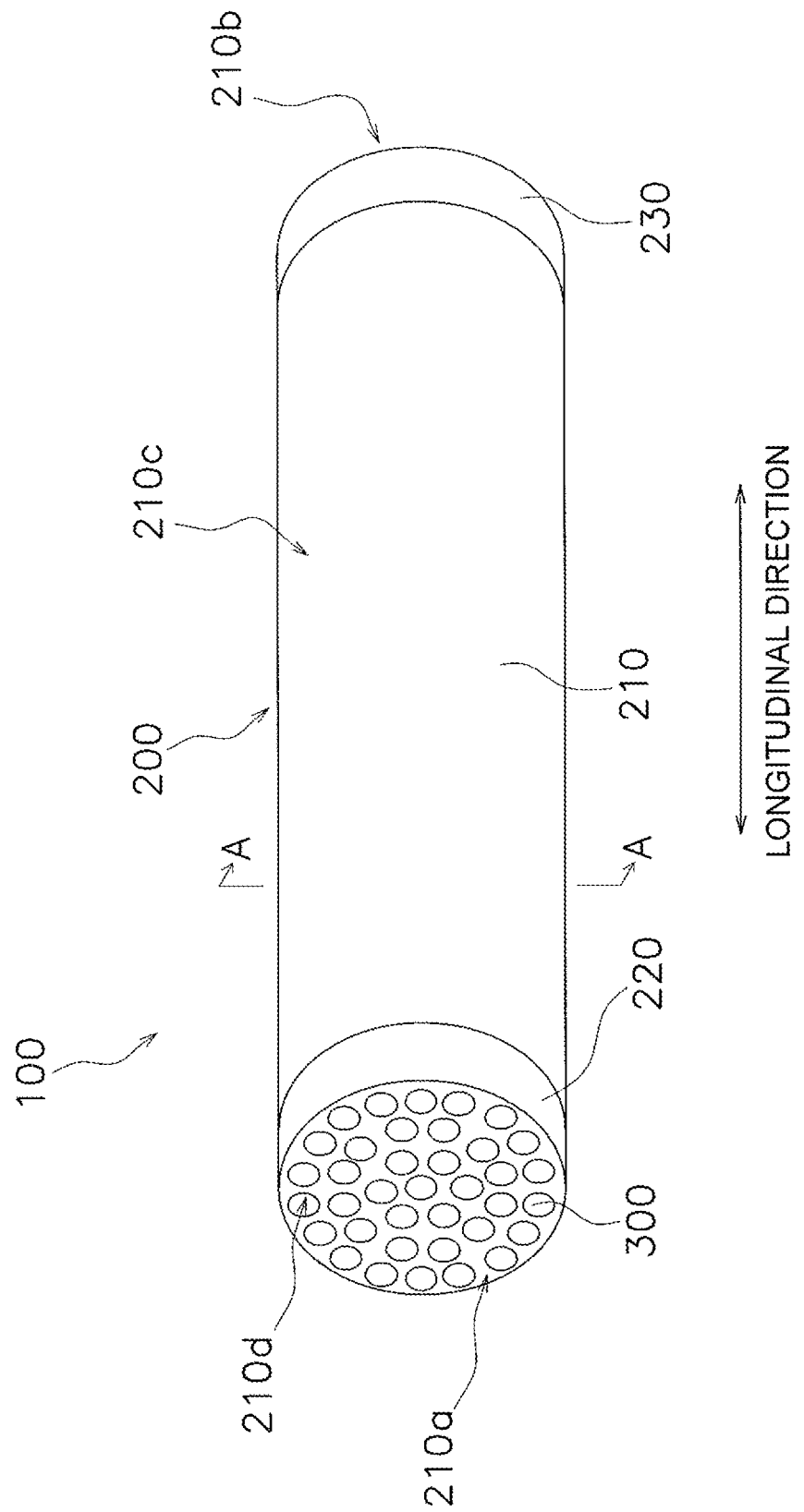
FIG. 1 is a perspective view illustrating a monolithic separation membrane structure.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, the term "monolithic" is a concept that denotes a shape that includes a plurality of through holes formed in a longitudinal direction, and includes a honeycomb shape.

Structure of Monolithic Separation Membrane Structure 100

Figure 2:
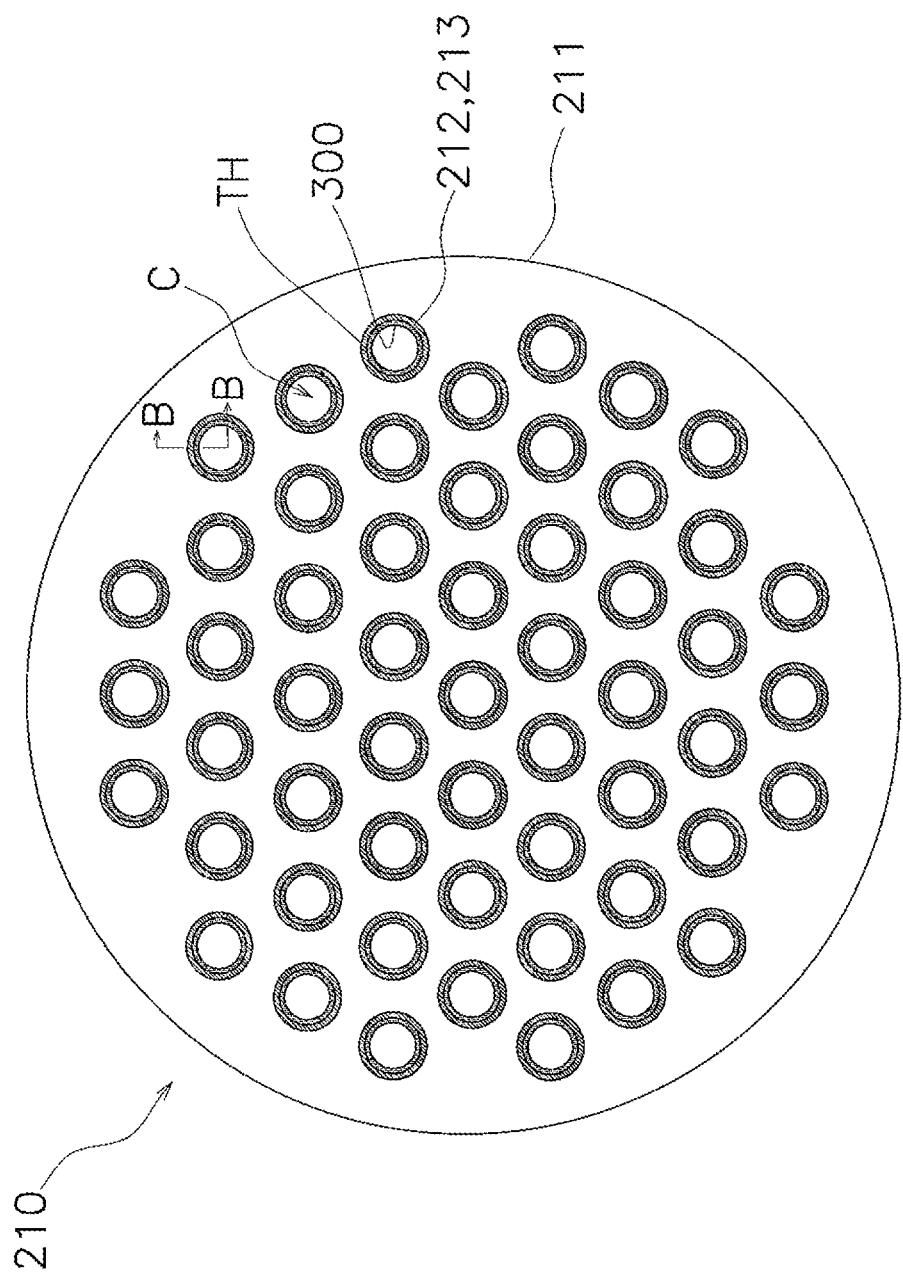
FIG. 2 illustrates a sectional view along the line A-A of FIG. 1.
Figure 3:
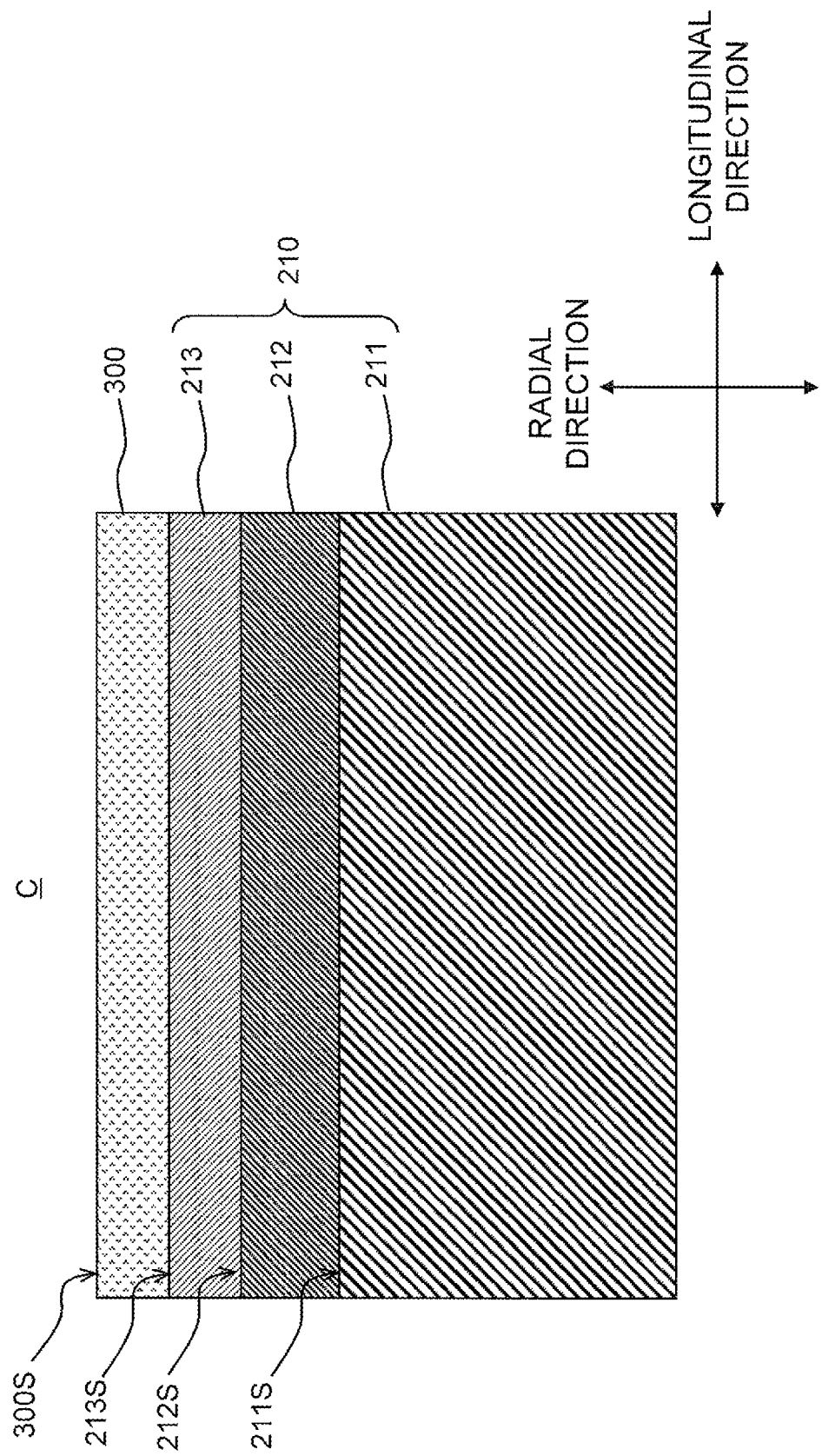
FIG. 3 illustrates a sectional view along the line B-B of FIG. 2.

FIG. 1 is a perspective view illustrating a monolithic separation membrane structure. FIG. 2 illustrates a sectional view along the line A-A of FIG. 1. FIG. 3 illustrates a sectional view along the line B-B of FIG. 2

The monolithic separation membrane structure 100 includes a monolithic substrate 200 and a separation membrane 300.

The monolithic substrate 200 includes a substrate main body 210, a first seal portion 220 and a second seal portion 230.

The substrate main body 210 is a porous body. The substrate main body 210 is formed as a circular cylinder. The length of the substrate main body 210 in a longitudinal direction is 150 to 2000 mm, and the diameter of the substrate main body 210 in the short width direction is 30 to 220 mm. However there is no limitation in this regard.

The substrate main body 210 has a first end surface 210a, a second end surface 210b and a side surface 210c. The first end surface 210a is provided opposite to the second end surface 210b. The side surface 210c is connected to the outer edge of the first end surface 210a and the second end surface 210b.

The substrate main body 210 includes a substrate 211, a first support layer 212 and a second support layer 213.

The substrate 211 is formed as a circular cylinder. A plurality of through holes TH is formed in the substrate 211. The through holes TH pass through the substrate 211 from the first end surface 210a to the second end surface 210b. The sectional shape of the through holes TH is circular. However there is no limitation in this regard. The inner diameter of the through holes TH is 1 to 5 mm. The inner diameter of a cell C as described hereafter can be enlarged by enlarging the inner diameter of the through holes TH.

The substrate 211 is formed by a porous material. The porous material that configures the substrate 211 includes use of a ceramic, metal, resin, or the like. In particular, use of a porous ceramic is preferred. The aggregate particles used in relation to the porous ceramic material include alumina ($Al_2O_3$), titania ($TiO_2$), mullite ($Al_2O_3 \cdot SiO_2$), potsherd, and cordierite ($Mg_2Al_4Si_5O_{18}$), and in particular, alumina is preferred in light of ease of availability, formation of a stable clay and anticorrosive properties.

The substrate 211 may include an inorganic binder in addition to the porous material. The inorganic binder may include at least one of titania, mullite, easily sinterable alumina, silica, glass frits, clay minerals, easily sinterable cordierite. The porosity of the substrate 211 may be 25 to 50%. The average pore diameter of the substrate 211 may be 5 micrometers to 25 micrometers and the average particle diameter of the porous material that configures the substrate 211 may be 5 micrometers to 100 micrometers.

In the present embodiment, the term "average particle diameter" is the arithmetic means for the maximum diameter of 30 measured particles that are measured by cross sectional micro-structure observation by use of a scanning electron microscope (SEM).

The first support layer 212 is formed on the inner surface 211S of the through holes TH of the substrate 211. The first support layer 212 has a tubular configuration. The first support layer 212 is formed from a porous ceramic material. More specifically, the first support layer 212 includes an aggregate material, an inorganic binder and a sintering additive.

The aggregate material of the first support layer 212 includes alumina as a principal component. The inorganic binder of the first support layer 212 includes titania as a principal component. The titania particles in the inorganic binder form a binding neck that covers at least a portion of the alumina particles in the aggregate material.

The sintering additive of the first support layer 212 includes at least one of silica and magnesia as a main component. The silica or magnesia in the sintering additive promotes sintering of the green body during sintering of the green body for the first support layer 212. The silica component or magnesia component is present in the interface of the titania particles and the alumina particles or between the titania particles. In this manner, the strength of the first support layer 212 is adapted to be enhanced by the distribution of the silica component or the magnesia component in proximity to the inorganic binder.

The titania concentration in the first support layer 212 is at least 5 wt % to no more than 40 wt %, and is preferably at least 10 wt % to no more than 30 wt %. When the first support layer 212 includes silica as a sintering additive, the silica concentration in the first support layer 212 is at least 0.1 wt % to no more than 40 wt %, is preferably at least 1 wt % to no more than 30 wt %, and is more preferably at least 0.25 wt % to no more than 6 wt %.

When the first support layer 212 includes magnesia as a sintering additive, the magnesia concentration in the first support layer 212 is at least 0.1 wt % to no more than 20 wt %, and is preferably at least 0.5 wt % to no more than 5 wt %.

When the first support layer 212 includes both silica and magnesia as a sintering additive, the silica concentration in the first support layer 212 is at least 0.1 wt % to no more than 40 wt %, and the magnesia concentration in the first support layer 212 is at least 0.1 wt % to no more than 20 wt %.

In the present embodiment, the concentration of the sintering additive is calculated as sintering additive amount/(aggregate material amount+inorganic binder amount)×100. The concentration of each component in the present embodiment is measured by use of energy dispersive x-ray spectroscopy (EDS).

In the present embodiment, the disclosure that a composition X includes a substance Y "as a main component" means that in relation to the total of the composition X, the substance Y preferably occupies at least 60 wt %, more preferably at least 70 wt % and still more preferably at least 90 wt %.

The thickness of the first support layer 212 in a direction vertical (hereafter referred to as the "radial direction") to the central axis of the through holes TH is 100 micrometers to 300 micrometers. In the present embodiment, since the strength of the first support layer 212 is enhanced by addition of at least one of silica and magnesia as described above, the surface area of the separation membrane 300 per filter can be increased by decreasing the thickness of the first support layer 212.

The porosity of the first support layer 212 may be configured as 5% to 60%. The average pore diameter of the first support layer 212 may be configured as 0.005 micrometers to 5 micrometers, and thereby is smaller than the average pore diameter of the substrate 211.

The second support layer 213 is formed on the inner surface 212S of the first support layer 212. The second support layer 213 has a tubular configuration. The second support layer 213 is composed of a porous ceramic material. More specifically, the second support layer 213 includes an aggregate material and a sintering additive. The aggregate material of the second support layer 213 includes alumina as a main component. The sintering additive of the second support layer 213 includes at least one of silica and magnesia as a main component. The silica and magnesia promote sintering of the green body when the green body for the second support layer 213 is sintered. The silica component and magnesia component of the sintering additive is distributed between the alumina particles of the aggregate material.

When the second support layer 213 includes silica as a sintering additive, the silica concentration in the second support layer 213 is preferably at least 0.01 wt % to no more than 40 wt %. When the second support layer 213 includes magnesia as a sintering additive, the magnesia concentration in the second support layer 213 is at least 0.01 wt % to no more than 40 wt %.

When the second support layer 213 includes both silica and magnesia as a sintering additive, the silica concentration in the second support layer 213 is at least 0.01 wt % to no more than 10 wt %, and the magnesia concentration in the second support layer 213 is at least 0.01 wt % to no more than 10 wt %.

The thickness of the second support layer 213 in the radial direction is 1 micrometer to 40 micrometers. The porosity of the second support layer 213 may be configured as 5% to 40%. The average pore diameter of the second support layer 213 may be configured as 0.005 micrometers to 2 micrometers and thereby be smaller than the average pore diameter of the first support layer 212.

The first seal portion 220 covers the whole surface of the first end surface 210a and a portion of the side surface 210c. The first seal portion 220 controls the direct permeation, from the first end surface 210b to the substrate main body 210, of the mixed fluid to be filtered that enters the through holes TH. The first seal portion 220 is formed so that a barrier is not formed in relation to the input port for the cell C that is described below. The material that configures the first seal portion 220 includes use of glass, metal or the like. However, glass is preferred in light of the adaptability with the thermal expansion coefficient of the substrate main body 210.

The second seal portion 230 covers the whole surface of the second end surface 210b and a portion of the side surface 210c. The second seal portion 230 controls the direct permeation, from the second end surface 210b to the substrate main body 210, of the mixed fluid that flows out of the through holes TH. The second seal portion 230 is formed so that a barrier is not formed in relation to the output port for the cell C. The second seal portion 230 may be composed of the same material as the first seal portion 220.

The separation membrane 300 has a tubular configuration. The separation membrane 300 is arranged in the through holes TH. In the present embodiment, the separation membrane 300 is formed on an inner surface 213S of the second support layer 213. The inner side of the inner surface 300S of the separation membrane 300 forms a cell C for flow of the mixed fluid. The inner diameter of the cell C in the radial direction may be configured as 0.5 mm to 3.5 mm. The inner diameter of the cell C affects the separation efficiency and the strength under internal pressure. The inner diameter of the cell C may be increased by decreasing the thickness of the first support layer 212 or by increasing the inner diameter of the through hole TH of the substrate 211. The surface area of the surface 300S of the separation membrane 300 can be increased by increasing the inner diameter of the cell C.

The separation membrane 300 is preferably composed of an inorganic material, metal or the like. The inorganic material of the separation membrane 300 includes zeolite, carbon, silica, or the like. The metal material used in relation to the separation membrane 300 includes palladium, or the like. When the separation membrane 300 is configured as a zeolite membrane, the zeolite may be used that exhibits a crystal structure such as LTA, MFI, FER, FAU, DDR, CHA, BEA, or the like. When the separation membrane 300 is a DDR zeolite membrane, use is particularly adapted in relation to a gas separation membrane for selective separation of carbon dioxide.

The thickness of the separation membrane 300 in the radial direction is preferably no more than 10 micrometers, and more preferably no more than 5 micrometers. The porosity of the separation membrane 300 may be configured as 0% to 20%. The average pore diameter of the separation membrane 300 may be configured as 0.1 nanometer to 1 micrometer and thereby be smaller than the average pore diameter of the first support layer 212 or the second support layer 213.

Method of Manufacturing Monolithic Separation Membrane Structure 100

Firstly, a ceramic body including a porous material is used to form the green body for the substrate 211 that exhibits a plurality of through holes TH. The method of forming the green body for the substrate 211 includes use of an extrusion molding method using a vacuum extrusion molding device, in addition to press molding method or slip cast method.

The substrate 211 is formed by firing (for example, 900 degrees C. to 1600 degrees C., 0 hours to 100 hours) the green body for the substrate 211.

A slurry for the first support layer is prepared by adding at least one of silica and magnesia as a sintering additive, an organic binder, a pH adjusting agent and a surface active agent to titania that is used as the inorganic binding agent and alumina that is used as the aggregate material.

The green body for the first support layer 212 is formed by a filtration method by use of the slurry for the first support layer. More specifically, a green body for the first support layer 212 is deposited on the inner surface 211S of the through holes TH by using a pump to draw the slurry for the first support layer from the inner surface S3 of the substrate 211 while supplying the slurry to the through holes TH.

Then the first support layer 212 is formed by firing (for example, 900 degrees C. to 1600 degrees C., 0.5 hours to 100 hours) the green body for the first support layer 212.

A slurry for the second support layer is prepared by adding at least one of silica and magnesia as a sintering additive, an organic binder, a pH adjusting agent and a surface active agent to alumina that is used as the aggregate material.

The green body for the first support layer 212 is formed by a filtration method by use of the slurry for the second support layer. More specifically, a green body for the second support layer 213 is deposited on the inner surface 212S of the first support layer 212 by using a pump to draw the slurry for the second support layer from the inner surface S3 of the substrate 211 while supplying the slurry to the inner side of the first support layer 212.

Then the second support layer 213 is formed by firing (for example, 900 degrees C. to 1600 degrees C., 0.5 hours to 100 hours) the green body for the second support layer 213.

The separation membrane 300 is formed on the inner surface 213S of the second support layer 213. The method for forming the separation membrane 300 may include use of a suitable method that is adapted to the type of the separation membrane 300. For example, when the separation membrane 300 forms a DDR type zeolite membrane, a seeding step using a flow-down method is performed in sequence with a sol hydrothermal synthesis step and a heating step for removing the structure directing agent. Furthermore, when forming a silica membrane as the separation membrane 300, a seeding step for a silica sol solution is performed in sequence with a firing step (150 degrees C. to 800 degrees C., 0 hours to 100 hours). When forming a carbon membrane as the separation membrane 300, a coating step for a precursor solution is performed in sequence with a firing step (150 degrees C. to 800 degrees C., 0 hours to 100 hours).

OTHER EMBODIMENTS

Although an embodiment of the present invention has been described, the present invention is not limited to the above embodiment, and various modifications are possible within a scope that does not depart from the spirit of the invention.

(A) In the above embodiment, the monolithic substrate 200 includes a substrate main body 210, a first seal portion 220 and a second seal portion 230. However, at least one of the first seal portion 220 and the second seal portion 230 may be omitted.

(B) In the above embodiment, the substrate main body 210 includes the substrate 211, the first support layer 212 and the second support layer 213. However, the second support layer 213 may be omitted. In that configuration, the separation membrane 300 is formed on the inner surface 212S of the first support layer 212.

(C) Although such a feature has not been disclosed in the above embodiment, the substrate main body 210 may include a third support layer between the substrate 211 and the first support layer 212. The third support layer may be configured using the same material as the substrate 211. However, further enhancement to strength characteristics may be imparted by a configuration using the same material as the first support layer 212.

The substrate main body 210 may include a fourth support layer between the first support layer 212 and the second support layer 213. The fourth support layer may be configured with the same material as the substrate 211. However, further enhancement to strength characteristics may be imparted by a configuration using the same material as the first support layer 212.

(D) In the above embodiment, the sectional shape of the cell C is rectangular. However a configuration as a circle, oval or polygon is also possible.

EXAMPLES

The examples of the present invention will be described below. However, the present invention is not thereby limited to the following examples.

Preparation of Samples No. 1 to No. 14

A monolithic separation membrane structure according to Samples No. 1 to No. 14 is prepared as described below.

Firstly a ceramic body is prepared by adding 10 parts by mass of glass frit to 100 parts by mass of alumina having an average particle diameter of 10 micrometers, then water, a dispersing agent and a thickener are added, and the mixture is kneaded.

A green body for the substrate that includes a plurality of through holes is prepared by extrusion molding of the prepared ceramic body.

The substrate is prepared by firing the green body for the substrate (1250 degrees C., 1 hour).

A slurry for the first support layer is prepared by adding an organic binder, a pH adjusting agent and a surface active agent to titania that is used as the inorganic binding agent and alumina that is used as the aggregate material. Then as shown in Table 1, silica powder is added as a sintering additive to Samples 3 to 8, 10 and 11, a silica sol is added as a sintering additive to Samples 12 to 14, and magnesia powder is added as a sintering additive to Sample 9. The respective added amounts of silica powder, silica sol and magnesia powder to the total weight of alumina and titania are shown in Table 1.

Next, a green body for the first support layer is deposited on the inner surface of the through holes by using a pump to draw the slurry for the first support layer from the inner surface of the substrate while supplying the slurry to the through holes.

Next, the green body for the first support layer is fired (1250 degrees C., 1 hour).

A slurry for the second support layer is prepared by adding magnesium acetate as a sintering additive, an organic binder, a pH adjusting agent and a surface active agent to alumina that is used as the aggregate material.

Next, the green body for the second support layer is fired (1250 degrees C., 10 hours).

Next a DDR membrane is formed on the inner surface of the second support layer.

Measurement of Strength

Each sample was placed into a separation device, and water under pressure was passed through an inner portion of the DDR membrane (that is to say, the cell) to thereby gradually increase the applied pressure until fracture of each sample. Table 1 states the fracture strength of each sample as applied pressure (MPa) at time of fracture.

TABLE 1

| Sample No. | Substrate Material | Material of First Support Layer | | | | |
|---|---|---|---|---|---|---|
| | | Material | Thickness (μm) | Titania Content (wt %) | Type of Sintering Additive | Added Amount of Sintering Additive (wt %) | Fracture Strength (MPa) |
| 1 | $Al_2O_3$ + glass | $Al_2O_2$ + $TiO_2$ | 150 | 17 | — | 0 | 14 |
| 2 | $Al_2O_3$ + glass | $Al_2O_2$ + $TiO_2$ | 250 | 17 | — | 0 | 16 |
| 3 | $Al_2O_3$ + glass | $Al_2O_3$ + $TiO_2$ + $SiO_2$ | 250 | 17 | Silica powder | 0.25 | 20 |
| 4 | $Al_2O_2$ + glass | $Al_2O_2$ + $TiO_2$ + $SiO_2$ | 250 | 17 | Silica powder | 0.5 | 22 |
| 5 | $Al_2O_3$ + glass | $Al_2O_3$ + $TiO_2$ + $SiO_2$ | 250 | 17 | Silica powder | 1 | 24 |
| 6 | $Al_2O_2$ + glass | $Al_2O_3$ + $TiO_2$ + $SiO_2$ | 250 | 17 | Silica powder | 2 | 25 |
| 7 | $Al_2O_3$ + glass | $Al_2O_3$ + $TiO_2$ + $SiO_2$ | 250 | 17 | Silica powder | 6 | 24 |
| 8 | $Al_2O_2$ + glass | $Al_2O_3$ + $TiO_2$ + $SiO_2$ | 250 | 17 | Silica powder | 10 | 18 |
| 9 | $Al_2O_3$ + glass | $Al_2O_3$ + $TiO_2$ + MgO | 250 | 17 | Magnesia | 2 | 20 |
| 10 | $Al_2O_3$ + glass | $Al_2O_3$ + $TiO_2$ + $SiO_2$ | 150 | 17 | Silica powder | 1 | 20 |
| 11 | $Al_2O_2$ + glass | $Al_2O_2$ + $TiO_2$ + $SiO_2$ | 150 | 17 | Silica powder | 2 | 21 |
| 12 | $Al_2O_3$ + glass | $Al_2O_3$ + $TiO_2$ + $SiO_2$ | 250 | 17 | Silica sol | 0.5 | 20 |
| 13 | $Al_2O_2$ + glass | $Al_2O_2$ + $TiO_2$ + $SiO_2$ | 250 | 17 | Silica sol | 0.5 | 20 |
| 14 | $Al_2O_3$ + glass | $Al_2O_3$ + $TiO_2$ + $SiO_2$ | 250 | 17 | Silica sol | 0.5 | 20 |

As shown in Table 1, Samples No. 3 to No. 14 to which silica powder, silica sol or magnesia powder were added as a sintering additive to the first support layer exhibit an increase in the fracture strength in comparison to Samples No. 1 and No. 2 to which a sintering additive was not added to the first support layer. In particular, a sufficient fracture strength was imparted to Samples No. 10 and No. 11 in which the thickness of the first support layer was 150 micrometers.

As shown in Table 1, further enhancement to the fracture strength is enabled when the silica concentration in the first support layer is at least 0.25 wt % and no more than 6 wt %. A feature in which the silica concentration in the first support layer coincides with the addition amount is confirmed by EDS analysis.

As shown by Table 1, the same effect is confirmed to result by a configuration in which silica powder is added as the sintering additive and by a configuration in which a silica sol is added. Furthermore, the same effect is confirmed to result by a configuration in which silica is added as the sintering additive, and by a configuration in which magnesia is added.

The invention claimed is:

1. A method for manufacturing a monolithic separation membrane structure comprising:
    forming a green body for a substrate, the substrate composed of a porous material and including a plurality of through holes;
    firing the green body for the substrate;
    forming a green body for a first support layer on an inner surface of the plurality of through holes by use of a material that contains an aggregate material having alumina as a main component, an inorganic binder having titania as a main component, and a sintering additive having silica as a main component;
    firing the green body for the first support layer;
    forming a green body for a second support layer on an inner surface of the first support layer by use of a material that contains alumina as a main component, and a sintering additive having at least one of silica and magnesia as a main component;
    firing the green body for the second support layer; and
    arranging a separation membrane on an inner side of the second support layer,
    wherein the silica concentration in the first support layer is at least 0.25 wt % to no more than 6 wt %, and the magnesia concentration in the second support layer is at least 0.01 wt % to no more than 40 wt %.

2. A monolithic separation membrane structure comprising:
    a substrate composed of a porous material and including a plurality of through holes;
    a first support layer formed on a surface of the plurality of through holes;
    a second support layer formed on an inner surface of the first support layer; and
    a separation membrane formed on an inner surface of the second support layer;
    wherein the first support layer includes alumina aggregate, titania inorganic binder and silica sintering additive, and the second support layer includes alumina and at least one of silica and magnesia,
    wherein the silica concentration in the first support layer is at least 0.25 wt % to no more than 6 wt %, and when the second support layer includes magnesia as a sintering additive, a magnesia concentration in the second support layer is at least 0.01 wt % to no more than 40 wt %.

3. A monolithic separation membrane structure comprising:
    a substrate composed of a porous material and including a plurality of through holes;
    a first support layer formed on a surface of the plurality of through holes;
    a second support layer formed on an inner surface of the first support layer; and
    a separation membrane formed on an inner surface of the second support layer;
    wherein the first support layer includes alumina aggregate, titania inorganic binder and silica sintering additive, and the second support layer includes alumina and at least one of silica and magnesia,
    wherein the silica concentration in the first support layer is at least 0.25 wt % to no more than 6 wt %, and when the second support layer includes both silica and magnesia as a sintering additive, a silica concentration in the second support layer is at least 0.01 wt % to no more than 10 wt %, and a magnesia concentration in the second support layer is at least 0.01 wt % to no more than 10 wt %.

4. The monolithic separation membrane structure according to claim 2, wherein the titania inorganic binder forms a binding neck that covers at least a portion of the alumina aggregate.

5. The monolithic separation membrane structure according to claim 3, wherein the titania inorganic binder forms a binding neck that covers at least a portion of the alumina aggregate.

* * * * *